United States Patent [19]
Weirauch

[11] Patent Number: 5,920,071
[45] Date of Patent: Jul. 6, 1999

[54] MERCURY CADMIUM TELLURIDE DEVICES FOR DETECTING AND CONTROLLING OPEN FLAMES

[75] Inventor: Donald F. Weirauch, Dallas, Tex.

[73] Assignee: Raytheon Company, Lexington, Mass.

[21] Appl. No.: 08/834,790

[22] Filed: Apr. 3, 1997

Related U.S. Application Data

[60] Provisional application No. 60/014,812, Apr. 4, 1996.

[51] Int. Cl.[6] ............................... G01J 1/42; G08B 17/12
[52] U.S. Cl. .................................... 250/370.13; 250/338.4
[58] Field of Search ........................... 250/370.13, 338.4; 431/14

[56] References Cited

U.S. PATENT DOCUMENTS

| | | | |
|---|---|---|---|
| 4,296,324 | 10/1981 | Kern et al. | 250/339 |
| 4,370,557 | 1/1983 | Axmark et al. | 250/554 |
| 4,594,226 | 6/1986 | Reedy | 422/89 |
| 4,691,196 | 9/1987 | Kern et al. | 340/578 |
| 4,769,775 | 9/1988 | Kern et al. | 364/551.01 |
| 4,785,292 | 11/1988 | Kern et al. | 340/578 |
| 4,956,686 | 9/1990 | Borrello et al. | 250/370.13 |
| 5,144,138 | 9/1992 | Kinch et al. | 250/370.13 |
| 5,249,954 | 10/1993 | Allen et al. | 431/14 |
| 5,422,484 | 6/1995 | Brogi et al. | 250/339.15 |
| 5,583,338 | 12/1996 | Goodwin | 250/370.13 |

*Primary Examiner*—Edward P. Westin
*Assistant Examiner*—Richard Hanig
*Attorney, Agent, or Firm*—Baker & Botts, L.L.P.

[57] ABSTRACT

This is a mercury cadmium telluride flame detector which can be operated at room temperature, and a method for making such a detector. It utilizes at least two different compositions of mercury cadmium telluride on a common substrate; and has at least two contact areas on at least one of said mercury cadmium telluride compositions. In one embodiment, the substrate 104 is transparent and an upper mercury cadmium telluride layer 88 is over an insulating layer 89, which insulating layer is over a lower mercury cadmium telluride layer 90 and the lower mercury cadmium telluride is on said substrate, and contact areas 86 are provided on said upper mercury cadmium telluride layer 88, whereby the lower layer 90 filters radiation prior to the radiation reaching the upper layer 88. Preferably the insulating layer is cadmium telluride, the contact areas 86 are mercury telluride, and said upper layer, said insulating layer and said lower layer are epitaxial layers. In another embodiment, the substrate is transparent and different compositions of mercury cadmium telluride are fabricated on a deposition template by liquid phase epitaxial growth where the composition varies with time during said growth of the film and a top portion of said film is lapped at an angle to provide a first lapped surface and a bottom portion of said film and said deposition template are lapped away to provide a second lapped surface substantially parallel to said first lapped surface, and said lapped film is adhered to the substrate and said lapped film is etched to provide said different compositions of mercury cadmium telluride spaced from one another.

21 Claims, 4 Drawing Sheets

MERCURY CADMIUM TELLURIDE DEVICES FOR DETECTING AND CONTROLLING OPEN FLAMES

This application claims priority under USC § 119(e)(1) of provisional application No. 60/014,812 filed Apr. 4, 1996.

CROSS-REFERENCE TO COMMONLY-OWNED, CO-FILED, RELATED APPLICATIONS

The following are commonly-owned, co-filed, related applications, and are incorporated by reference herein; "NARROW BAND INFRARED FILTER DETECTORS" U.S. Ser. No. 08/831,103 filed Apr. 1, 1997; "MERCURY CADMIUM TELLURIDE INFRARED FILTERS AND DETECTORS AND METHODS OF FABRICATION" U.S. Ser. No. 08/831,170 filed Apr. 2, 1997; "UNCOOLED MERCURY CADMIUM TELLURIDE INFRARED DEVICES WITH INTEGRAL OPTICAL ELEMENTS" U.S. Ser. No. 08/834,790 filed Apr. 3, 1997; "UNCOOLED INFRARED SENSORS FOR THE DETECTION AND IDENTIFICATION OF CHEMICAL PRODUCTS OF COMBUSTION" U.S. Ser. No. 08/831,101 filed Apr. 1, 1997; "A METHOD OF FABRICATING A LATERALLY CONTINUOUSLY GRADED HGCDTE LAYER" U.S. Ser. No. 08/831,813 filed Apr. 2, 1997; "INTEGRATED IR DETECTOR SYSTEM" U.S. Ser. No. 08/831,815 filed Apr. 2, 1997; and "NARROW BAND INFRARED FILTER-DETECTORS" U.S. Ser. No. 08/831,814 filed Apr. 2, 1997 (Abandoned).

FIELD OF THE INVENTION

This invention generally relates to devices for the detection of open flames to signal hazardous conditions as well as infrared sensing devices for the control of manufacturing processes and, more specifically, to the design, fabrication and application of such devices heretofore operated at cryogenic temperatures.

BACKGROUND OF THE INVENTION

When materials burn or explode, emission of light in the visible as well as the invisible infrared (IR) and ultraviolet (UV) wavelengths occur. The chemical composition of the burning flame determines the wavelengths of light emitted. These emissions can be detected by various photosensitive devices for safety, process control or spectroscopic purposes.

Fire detection systems which furnish an electrical output signal in response to a sudden flame or explosion are well known. Such systems are available on the open market, but are high cost items. One of the reasons for this high cost has been the low sensitivity from available detectors as well as the high cost of detector manufacture. The low sensitivity results in low signal to noise ratio of the system which causes a high rate of false alarms. To circumvent the problem of false alarms, the use of individual detectors having different spectral responses has been taught by Kern, et al (see U.S. Patents to Kern et al.: U.S. Pat. No. 4,296,324 entitled "DUAL SPECTRUM INFRARED FIRE SENSOR", issued Oct. 20, 1981; U.S. Pat. No. 4,691,196 entitled "DUAL SPECTRUM FREQUENCY RESPONDING FIRE SENSOR", issued Sep. 1, 1987; U.S. Pat. No. 4,769,775 entitled "MICROPROCESSOR-CONTROLLED FIRE SENSOR", issued Sep. 6, 1988; and U.S. Pat. No. 4,785,292 entitled "DUAL SPECTRUM FREQUENCY RESPONDING FIRE SENSOR", issued Nov. 15, 1988). In addition, intensity comparisons have been made between UV and IR wavelengths to further reduce false alarms. Complex microprocessor logic has been employed to analyze the flicker frequency of the radiation to distinguish a flame from background IR emission.

Axmark, et al (see U.S. Patent to Axmark et al. U.S. Pat. No. 4,370,557 entitled "DUAL DETECTOR FLAME SENSOR" issued Jan. 25, 1983) teaches a system using dual, individual, dissimilar detectors for the control of a multi-burner boiler or industrial furnace installation. The detectors used in Axmark were a silicon (Si) detector responsive to visible light and an IR responsive lead-sulfide (PbS) detector with emphasis on the use of both the direct current (dc) and alternating current (ac) responses of these detectors.

In medical research and chemical analysis, IR spectroscopy is often useful. Instruments to perform this type of analysis typically cost $10,000.00 in 1994 U.S. dollars.

Military applications are another expensive use of IR detection systems. Such systems are generally used for IR imaging similar to radar or for the guidance of heat seeking missiles. Although many different materials are used for these detectors, one of these is mercury-cadmium-telluride, HgCdTe, hereafter referred to as MCT. MCT detectors are cooled well below atmospheric temperatures, typically 77° Kelvin, to accomplish detectivity of targets near atmospheric temperature.

SUMMARY OF THE INVENTION

The present invention applies MCT (HgCdTe) detectors in an uncooled environment for the detection and control of open flames. This greatly reduces cost over conventional systems due to (1) the elimination of cryogenic cooling equipment, (2) the use of mature semiconductor fabrication technology and (3) the greatly improved signal to noise ratios over other pyrolytic flame detectors. When PbS detectors were applied to commercial flame sensors, they were cited as being 1,000 times more sensitive than pyroelectric detectors. MCT detectors operating at atmospheric temperature are equal to the sensitivity of PbS but have the additional advantage that their IR response can be "tuned" by the fabrication process. This control of MCT detector's spectral response is performed by varying the composition of the three elements. Many embodiments of this invention use novel processes to achieve the desired IR spectral selectivity by controlling the composition of MCT during film deposition as well as the forming of three dimensional structures through the use of mechanical angle lapping with a diamond point turning (DPT) machine.

A wide choice of fabrication techniques is another advantage claimed for this invention. Embodiments of this invention allow deposition of MCT films to be performed by the well known semiconductor processes of metal-organo chemical vapor deposition (MOCVD) and molecular beam epitaxial growth (MBE). In addition, MCT films can be deposited by the less familiar method of liquid phase epitaxial growth (LPE) which will be described.

Other embodiments of this invention show that a plurality of MCT detectors on the same substrate can be easily realized. Since these multiple film detectors can be fabricated in one deposition cycle, this is a particularly cost effective way of realizing detectors having multiple spectrum responses.

Other embodiments of this invention concern the IR transmission and electrical conductance characteristics of MCT which may be used to advantage in novel device structures. When multiple layer devices are formed, it is sometimes desired to separate them by an IR opaque but electrically conducting material. HgTe fulfills this requirement. In the preferred embodiments containing stacked films, CdTe fills the need for an IR transparent but electrically insulating material.

This is a mercury cadmium telluride flame detector which can be operated at room temperature, and a method for making such a detector. It utilizes at least two different compositions of mercury cadmium telluride on a common substrate; and has at least two contact areas on at least one of the mercury cadmium telluride compositions. In one embodiment, the substrate is transparent and an upper mercury cadmium telluride layer is over an insulating layer, which insulating layer is over a lower mercury cadmium telluride layer and the lower mercury cadmium telluride is on the substrate, and the contact areas are provided on the upper mercury cadmium telluride layer, whereby the lower layer filters radiation prior to the radiation reaching the upper layer. Preferably the insulating layer is cadmium telluride, the contact areas are mercury telluride, and the upper layer, the insulating layer and the lower layer are epitaxial layers. In another embodiment, the substrate is transparent and different compositions of mercury cadmium telluride are fabricated on a deposition template by liquid phase epitaxial growth where the composition varies with time during the growth of the film and a top portion of the film is lapped at an angle to provide a first lapped surface and a bottom portion of the film and the deposition template are lapped away to provide a second lapped surface substantially parallel to the first lapped surface, and the lapped film is adhered to the substrate and the lapped film is etched to provide said different compositions of mercury cadmium telluride spaced from one another.

Some of the advantages of the use of uncooled MCT in IR detectors for the detection and control of open flames are (1) application tailored spectral responses are easily realized, (2) fabrication costs are economical, (3) lower total systems cost and complexity because of the high IR sensitivity, (4) the compositionally controlled IR transmission of MCT films from opaque to transparent and (5) the compositionally controlled electrical conductance from highly conducting to insulating. From these many desirable characteristics, great utility is realized for the detection of IR emission for fire protection and manufacturing control at high sensitivity and economical cost.

BRIEF DESCRIPTION OF THE DRAWINGS

In the drawings, which form an integral part of the specification and are to be read in conjunction therewith, and in which like numerals and symbols are employed to designate similar components in various views unless otherwise indicated:

FIG. 7(b) is a sketch of a multiple wavelength detector made from the film of

FIG. 7(a) by means of a diamond point tool followed by chemical etching.

DETAILED DESCRIPTION OF PREFERRED EMBODIMENTS

This description of some of the preferred embodiments will be aided by the referral to FIGS. 1–8 and Tables 1–3. For the clarity of illustration, the MCT device sketches are neither to absolute or relative scale. The film thicknesses sketched are greatly exaggerated.

TABLE 1

Figure 1:
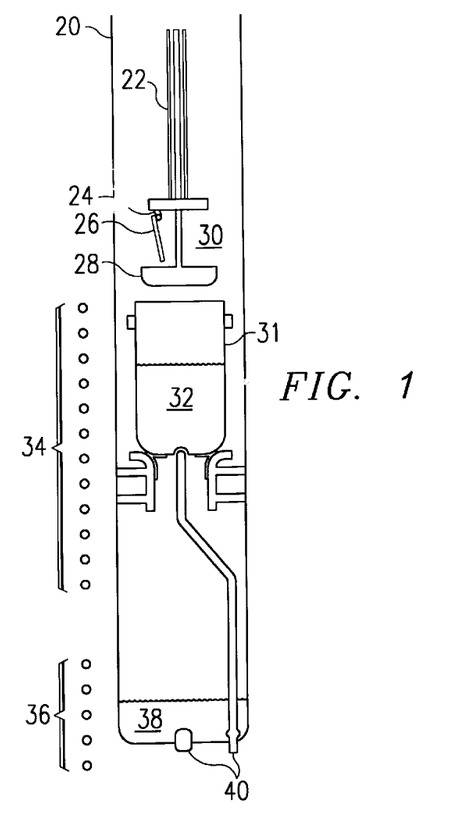
FIG. 1 is a sketch of an LPE growth apparatus as used for the growth of MCT films.

| ID# | Description | Function |
|---|---|---|
| 20 | Process chamber | Seals process environment |
| 22 | Substrate and holder support | Supports and rotates substrate for uniform film deposition. |
| 24 | Substrate holder | Supports substrate during deposition |
| 26 | CdTe or CdZnTe substrate | Provides surface for epitaxially growing MCT. |
| 28 | Stirrer | Agitates CdTe melt 32 for uniform deposition on substrate 26 |
| 30 | Hg vapor | Provide Hg vapor environment as component of MCT. |
| 31 | Crucible | Container for 32 |
| 32 | Melt | Molten CdTe source for MCT film deposition. |
| 34 | Heater | Control temperature of upper process chamber. |
| 36 | Heater | Control vapor pressure of Hg. |
| 38 | Hg | Hg vapor source |
| 40 | Thermocouple wells | Monitor temperatures to control 34 and 36. |

Figure 2:
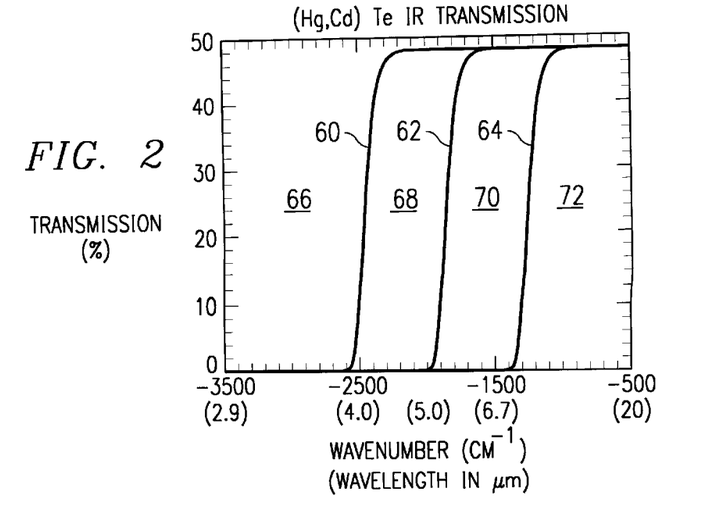
FIG. 2 is a graph showing the IR transmission of three different MCT film compositions at room temperature. This indicates how spectral response may be controlled by the deposited film composition.

FIG. 2 is a graph of a model of the IR transmission (%) versus wavenumber ($cm^{-1}$) for the MCT film composition $(Hg_{(1-x)}Cd_x)Te$. The IR wavelength in $\mu m$ is ~$10^4$ divided by the wavenumber. For graph 60, x=0.3. For graph 62, x=0.25. For graph 64, x=0.2. The abscissa of the graph runs from a wavenumber of ~3500 (corresponding to a wavelength of 2.9 $\mu m$) to a wavenumber of ~500 (corresponding to a wavelength of 20 $\mu m$.) The transmission percentages modeled are illustrative but less than actual because no anti-reflection coatings are assumed. The wavelengths 66 to the left of 60 (4.0 $\mu m$ and shorter) are absorbed by MCT film 60 and, if electrodes are attached, an increase in conductance of 60 could be detected when emission in the 66 spectral region illuminates the MCT film. Conversely, wavelengths in regions 68, 70 and 72 which are longer than 4.0 $\mu m$ would be transmitted through film 60 and no change of conductance in 60 would be seen when illuminated at wavelengths longer than 4.0 $\mu m$ within spectral regions 68, 70, 72. The novel customization of IR detectors for specific wavelengths makes use of these physical properties.

Figure 3:
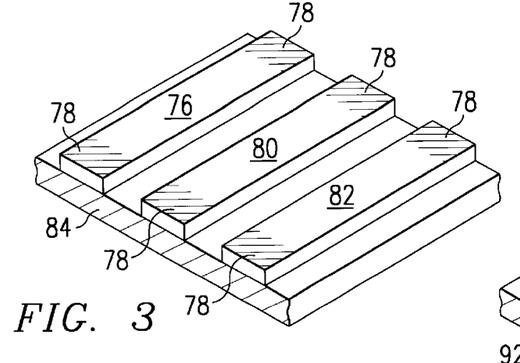
FIG. 3 is a sketch showing an IR sensor made from a plurality of side-by-side MCT sensors on a common substrate each of which has a different spectral response.

A preferred embodiment sketched in FIG. 3 and described in Table 2 shows a plurality of MCT detectors 76, 80 and 82 on a common substrate 84. Ohmic electrical contacts 78 are made by standard semiconductor processing techniques which are then attached to external sensing circuitry. To show the utility of such an embodiment, for the purpose of example, assume that 76 corresponds to an MCT composition that detects all wavelengths shorter than 10 $\mu m$. To improve false alarm rates, detector 76 could be used as a general enabling signal for detectors 80 and 82.

TABLE 2

| ID# | Function | Description | Alternates |
|---|---|---|---|
| 76 | Detects IR at wavelengths of 10 μm and below. | $Hg_{0.82}Cd_{0.18}Te$ film | Any wavelength band for compositions of $Hg_{(1-x)}Cd_xTe$ with x from 0.1 to 0.9. |
| 78 | Ohmic contacts | HgTe film | |
| 80 | Detects IR at wavelengths of 4.0 μm and below. | $Hg_{0.7}Cd_{0.3}Te$ film | Any wavelength band for compositions of $Hg_{(1-x)}Cd_xTe$ with x from 0.1 to 0.9. |
| 82 | Detects IR at wavelengths of 5.0 μm and below. | $Hg_{0.75}Cd_{0.25}Te$ film | Any wavelength band for compositions of $Hg_{(1-x)}Cd_xTe$ with x from 0.1 to 0.9. |
| 84 | Substrate for epitaxial film growth, IR transparent or opaque. | CdTe or CdZnTe substrate. | |

Assuming that 80 responds to wavelengths shorter than 4.0 μm and 82 responds to wavelengths shorter than 5 μm, we could easily determine if the detected flame radiation contains a component between 4.0 and 5.0 μm. The sensor configuration can be such to detect radiation on the sensor side of the substrate or, with a transparent electrically insulating substrate such as CdTe or cadmium-zinc-telluride (CdZnTe), radiation through the substrate could be detected.

Optical filters and lenses can be used between the location to be monitored and the MCT detectors for further enhancement if desired.

Figure 4:
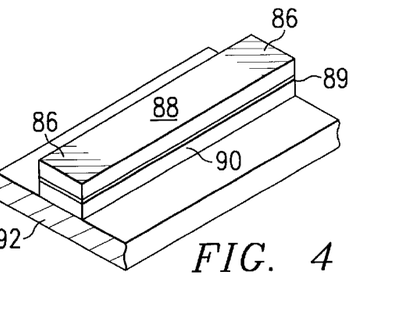
FIG. 4 is a sketch of a sensor made from stacked MCT films of different compositions to implement an IR bandpass filter.

A sensor embodiment of stacked MCT films is sketched in FIG. 4. For the purpose of illustration, this topology assumes that substrate 92 is transparent to IR. MCT film 90 is an optical filter and has a composition that absorbs wavelengths shorter than, say, 5.0 μm and passes all wavelengths longer than this. Film 89 is CdTe which is IR transmissive but an electrical insulator. This prevents the changes of conductance of MCT film 90 from affecting the detected conductance of MCT film 88. MCT film 88 has a composition that detects all wavelengths shorter than, say, 6.0 μm. Electrodes 86 coupled to external electronic circuitry will sense an increase in conductivity when radiation between 5.0 and 6.0 μm is passed through the substrate 92. There can be a plurality of such pass-band IR filter detectors on a common substrate for the detection of specific IR wavelengths, forming a comb filter, either for the purpose of spectroscopic analysis, control or safety alarms. The range of alternate compositions for the MCT films 88 and 90 have been shown previously as alternates in Table 2.

TABLE 3

Figures 5, 6:
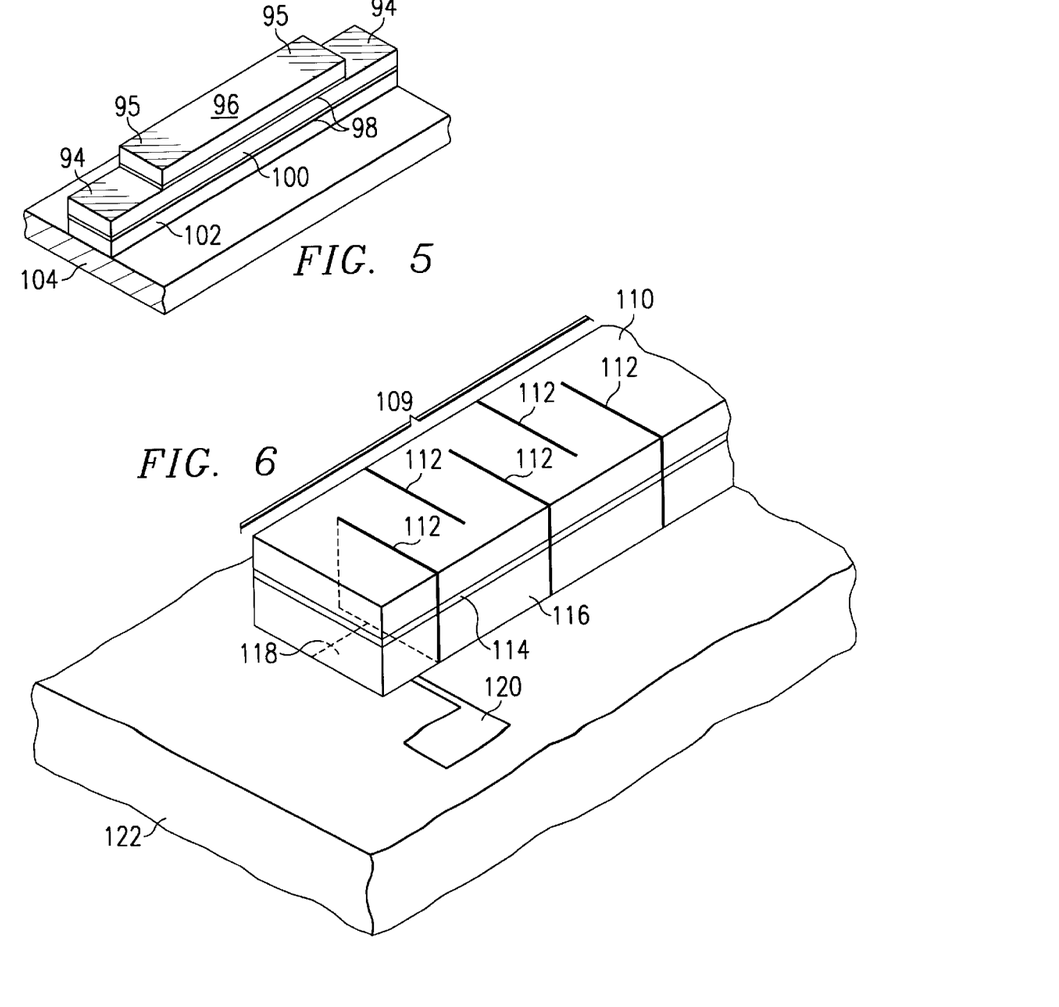
FIG. 5 is a sketch of a stacked MCT film detector which responds to two IR spectral pass-bands.
FIG. 6 is a sketch of a serpentine configuration of an MCT detector to provide increased detector surface area and electrical resistance when desired for better matching to associated electronic processing circuitry.

| ID# | Function | Description | Alternates |
|---|---|---|---|
| 94 | Ohmic contacts for 100 | HgTe film | |
| 95 | Ohmic contacts for 96 | HgTe film | |
| 96 | IR absorption and detection of wavelengths of 6.7 μm below. | $Hg_{0.8}Cd_{0.2}Te$ film | Any wavelength band for compositions of $Hg_{(1-x)}Cd_xTe$ with x from 0.1 to 0.9. |
| 98 | IR transparent insulator | CdTe film | |
| 100 | IR absorption and detection of wavelengths of 5.0 μm and below | $Hg_{0.75}Cd_{0.25}Te$ film | Any wavelength band for compositions of $Hg_{(1-x)}Cd_xTe$ with x from 0.1 to 0.9. |
| 102 | IR absorption of wavelengths of 4.0 μm and below | $Hg_{0.7}Cd_{0.3}Te$ film | Any wavelength band for compositions of $Hg_{(1-x)}Cd_xTe$ with x from 0.1 to 0.9. |
| 104 | IR transparent, electrically insulating substrate | CdTe | |

Another embodiment which is particularly useful for (but not restricted to) ratiometric comparison of radiation intensities within two IR pass-bands is shown in FIG. 5. The electrical contacts 94 and 95 are used to monitor the changes of conductance of films 96 and 100 by means of external circuitry. For ease of description, we will use the three film compositions in the graphs of FIG. 2. MCT film 96 will be assumed to be 64 and detect all wavelengths shorter than 6.7 μm. Films 98 are IR transmissive and electrically insulating CdTe which electrically isolates MCT films 96, 100, and 102 from each other. MCT film 100 will be assumed to be 62 which will detect and absorb all wavelengths shorter than 5.0 μm and transmit all wavelengths longer than 5.0 μm. MCT film 102 is used as an optical filter and will absorb all wavelengths shorter than 4.0 μm and transmit longer wavelengths. Substrate 104 is an electrical insulator which is optically transparent and is exposed to the radiation to be detected. Since 102 absorbs wavelengths lower than 4.0 μm and 100 detects all wavelengths lower than 5.0 μm, electrodes 94 are used to detect radiation in the pass-band of 4.0–5.0 μm. MCT film 100 also transmits wavelengths longer than 5.0 μm. Since MCT film 96 detects all wavelengths shorter than 6.7 μm, electrodes 95 are used to detect radiation in the pass-band of 5.0–6.7 μm. The wavelengths used in the description of this embodiment are not restrictive to this preferred embodiment and neither are the number of films stacked or mounted on the same substrate.

For applications requiring higher electrical response and greater sensitivity, FIG. 6 sketches one preferred embodiment of achieving such characteristics. MCT film 110 is deposited to perform the function of an optical filter to absorb all IR radiation below a specified wavelength. Film 114 is CdTe to pass IR but insulate film 110 from MCT film 116. A chemical string saw is used to saw slots 112 in the sensing device 109 to fabricate a long, narrow sensing geometry. Electrical connection to detect the change of conductance of 116 is made by contact 118 which is electrically bonded to pad 120. This electrical connection between 118 and 120 can be effected by conducting epoxy or a low eutectic temperature solder (not shown.) The other electrical connection to 116 (not shown) is performed in the same manner. The supporting package base 122 is optically opaque. IR detection is through the surface of 110. The range of alternate MCT compositions for 110 and 116 are the same as shown in Table 3.

Figure 7A:
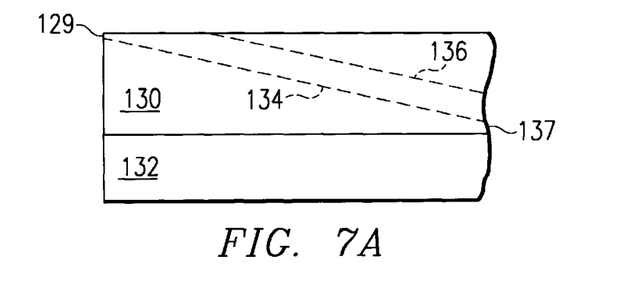
FIG. 7(a) shows the deliberate compositional change from the top (last deposited) of the MCT film to the bottom (first deposited) to produce a graded IR spectral response through the MCT film thickness.
Figure 7B:
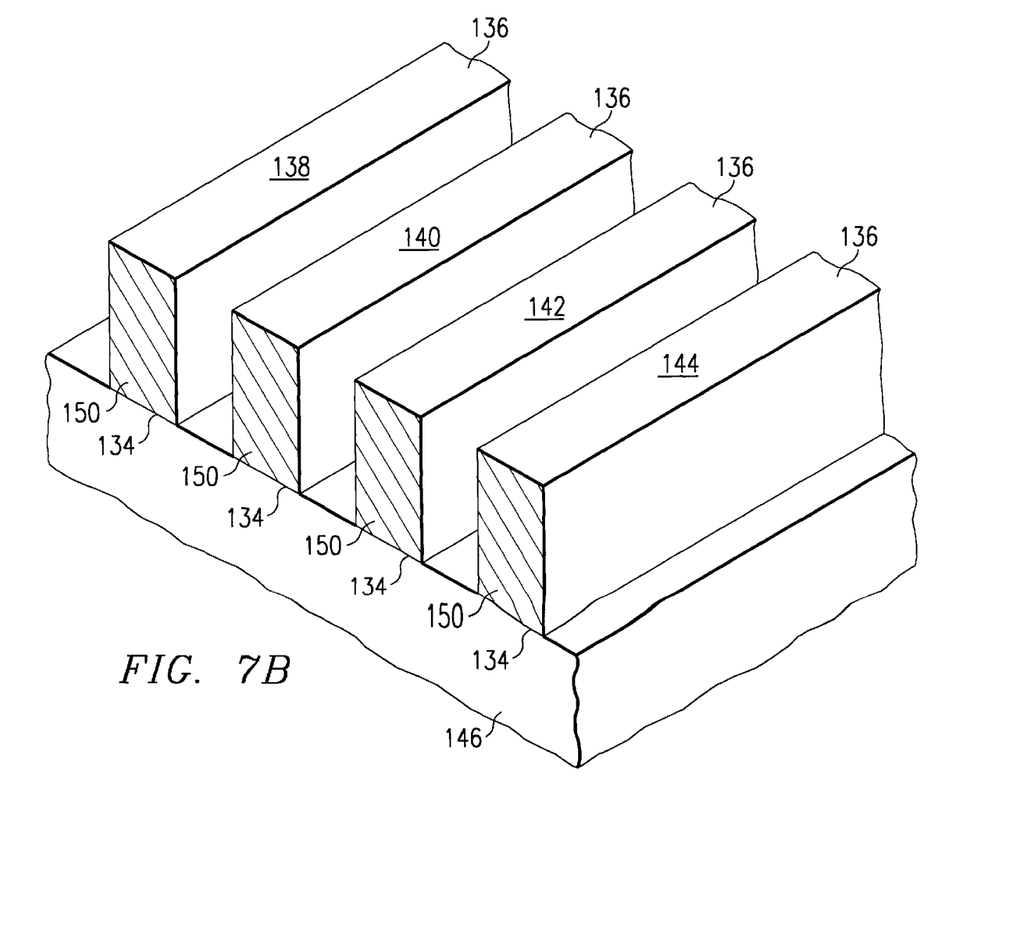
Figure 8A:
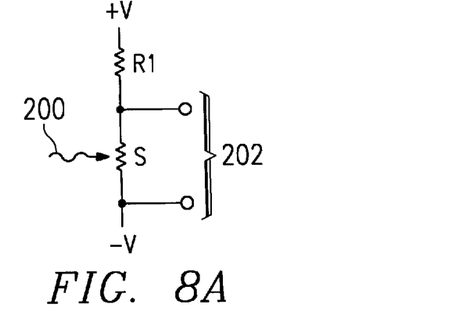
FIGS. 8(a), (b), (c) and (d) illustrate primitive schematics of a few of the numerous ways that changes in sensor conductance/resistivity can be converted into electrical signals.
Figure 8B:
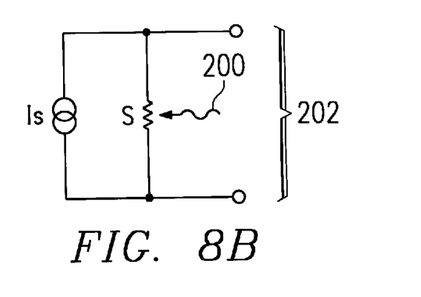
Figure 8C:
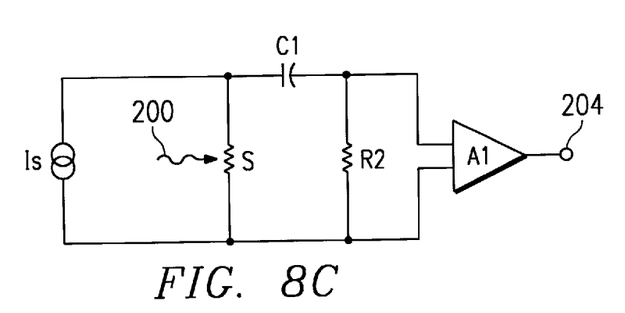
Figure 8D:
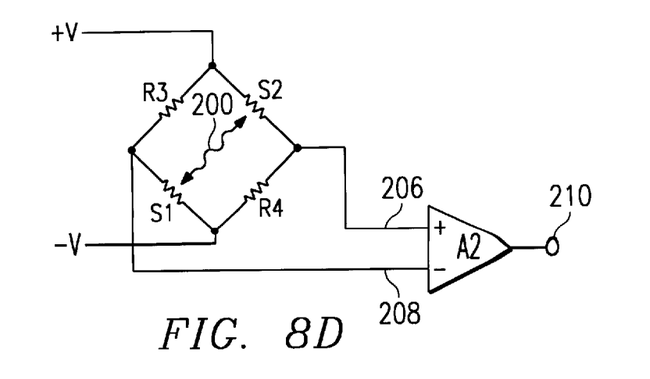

FIGS. 7(a) & (b) illustrate preferred embodiments to achieve broadband detection of many IR wavelengths. In FIG. 7(a), the MCT film 130 is deliberately grown too fast for a uniform composition by means of LPE. As a consequence, the top surface 129 is rich in Cd and surface 137 has significantly less Cd in the film composition. This compositional gradient can range from $Hg_{0.1}Cd_{0.9}Te$ to $Hg_{0.9}Cd_{0.1}Te$. The structure is now lapped with a diamond point tool from the top along the plane 136 and from the bottom along plane 134 removing the deposition substrate 132. The remaining MCT between planes 136 and 134 is now affixed to substrate 146 and chemically etched into strips as shown in FIG. 7(b). IR detectors 138, 140, 142 and 144 will have different IR spectral responses due to the original compositional gradient of the MCT film. The electrical contacts 150 on both ends of 138, 140, 142 and 144 provide the connection to external electronic processing circuitry.

A few of the numerous ways of extracting an electrical signal from the MCT detectors are shown in FIG. 8. In FIG. 8(a) a simple voltage divider made of resistor R1 in series with MCT sensor S is coupled to a voltage source whose terminals are +V and −V. When S is exposed to the proper wavelength of IR radiation 200, this raises the conductance of S. A change of voltage occurs at output terminals 202. Similarly in FIG. 8(b) when S is driven by a constant current source $I_s$ a change in voltage occurs at terminals 202 when illuminated by radiation 200. Where the rate of change of the conductance of sensor S is important, an ac coupled circuit such as FIG. 8(c) can be used. Here sensor S is driven from constant current source $I_s$ and ac coupled to amplifier A1 by capacitor C1 and R2. The output terminal 204 will now respond to the changes of conductance of S when changes in 200 (such as due to flame flickering) occur. FIG. 8(d) shows one method of using two MCT sensors S1 and S2 in a bridge connection with resistors R3 and R4. In the absence of radiation 200, the resistance of S1 is greater than R3 and the resistance of S2 is greater than R4. The bridge is driven by voltage +V and −V such that under the absence of radiation 200, terminal 208 is more positive than terminal 206 of differential amplifier A2. The output terminal 210 is driven to a low voltage under these conditions. When the proper wavelength radiation 200 illuminates S1 and S2, the resistance of S1 is now less than R3 and the resistance of S2 is less than R4. The bridge output to terminals 206 and 208 now reverses in polarity such that 210 is driven positive. These are only a few of the numerous ways that changes in the conductance of MCT sensors can be detected by external electronic circuitry.

While this invention has been described with reference to illustrative embodiments, this description is not intended to be construed in a limiting sense. For example, radiation detection through a transparent substrate was used in several specific embodiments but an opaque substrate with illumination through a package window or by fiber optic transmission is equally suitable. The analog changes of MCT sensor conductance can be converted to digital signals by conventional means and used with digital signal processing algorithms for further enhancements.

Although embodiments of specific manufacturing control applications were not detailed, the comparison of IR intensities at specific wavelengths associated with the burning of hydrocarbons when compared to wavelengths associated with waste gases such as water and carbon dioxide can be harnessed to achieve desired performance such as lower environment contamination, improved energy conservation and lower manufacturing costs. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method of fabricating a mercury cadmium telluride flame detector which can be operated at room temperature, comprising:

forming at least two different compositions of mercury cadmium telluride on a common substrate; and providing at least two contact areas on at least one of said mercury cadmium telluride compositions;

wherein a mercury cadmium telluride upper layer is over an insulating layer, which insulating layer is over a mercury cadmium telluride lower layer and the mercury cadmium telluride lower layer is on said substrate, and said contact areas are provided on said mercury cadmium telluride upper layer;

wherein said insulating layer is cadmium telluride, and said upper layer, said insulating layer and said lower layer are grown sequentially on a deposition template by liquid phase epitaxy; and wherein vertical cuts are made through said upper layer, said insulating layer and said lower layer to provide a serpentine configuration between said contact areas.

2. The method of claim 1, wherein said upper layer is grown on said deposition template, said insulating layer is grown on said upper layer and said lower layer is grown on said insulating layer.

3. The method of claim 1, wherein a top layer is over said upper layer, and said top layer is insulated from said upper layer, and contact areas are provided on both the upper and the top layers.

4. The method of claim 1, wherein said upper layer, said insulating layer and said lower layer are removed from said deposition template and adhered to said common substrate.

5. The method of claim 1, wherein said at least one of said mercury cadmium telluride composition with said at least two contact areas has two opposing vertical ends, and has said contact areas on said vertical ends.

6. The method of claim 1, wherein said substrate is transparent.

7. The method of claim 6, wherein said contact. areas are provided on said upper layer, whereby the lower layer filters radiation prior to the radiation reaching the upper layer.

8. The method of claim 1, wherein said contact areas are mercury telluride.

9. A method of fabricating a mercury cadmium telluride flame detector which can be operated at room temperature, comprising:

forming at least two different compositions of mercury cadmium telluride on a common substrate; and providing at least two contact areas on at least one of said mercury cadmium telluride compositions;

wherein said common substrate is electrically insulating and said different compositions of mercury cadmium telluride are directly on said common substrate and said different compositions of mercury cadmium telluride are electrically insulated by being spaced from one another on said substrate; and wherein said substrate is transparent and wherein said different compositions of mercury cadmium telluride are fabricated on a deposition template by liquid phase epitaxial growth of mercury cadmium telluride and wherein the composition varies with time during said growth to form a mercury cadmium telluride film, and wherein a top portion of said film is lapped at an angle to provide a first lapped surface and wherein a bottom portion of said film and said deposition template are lapped away to provide a second lapped surface substantially parallel to said first lapped surface, and wherein said lapped film is adhered to said substrate and said lapped film is, etched to provide said different compositions of mercury cadmium telluride spaced from one another.

10. A mercury cadmium telluride flame detector which can be operated at room temperature, comprising:

at least two different compositions of mercury cadmium telluride on a common substrate; and at least two contact areas on at least one of said mercury cadmium telluride compositions;

wherein said substrate is transparent and a mercury cadmium telluride upper layer is over an insulating layer, which insulating layer is over a mercury cadmium telluride lower layer and the mercury cadmium telluride lower layer is on said substrate, and said contact areas are provided on said mercury cadmium telluride upper layer, whereby the lower layer filters radiation prior to the radiation reaching the upper layer; and wherein said insulating layer is cadmium telluride, and said upper layer, said insulating layer and said lower layer are epitaxial layers.

11. The detector of claim 10, wherein a top layer is over said upper layer, and said top layer is insulated from said upper layer, and contact areas are provided on both the upper and the top layers.

12. The detector of claim 10, wherein vertical cuts through said upper layer, said insulating layer and said lower layer provide a serpentine configuration between said contact areas.

13. The detector of claim 10, wherein said at least one of said mercury cadmium telluride composition with said at least two contact areas has two opposing vertical ends, and has said contact areas on said vertical ends.

14. An infrared detector, comprising: a substrate; a mercury cadmium telluride layer provided over said substrate, said mercury cadmium telluride layer having a serpentine configuration; and contact areas provided on said mercury cadmium telluride layer at opposite ends thereof.

15. A detector according to claim 14, wherein said mercury cadmium telluride layer has alternating recesses in opposite sides thereof, said recesses imparting to said mercury cadmium telluride layer the serpentine configuration thereof.

16. A detector according to claim 14, including a further mercury cadmium telluride layer having a serpentine configuration, and including an insulating layer provided between said mercury cadmium telluride layers.

17. A detector according to claim 16, wherein said mercury cadmium telluride layers each have alternating recesses in opposite sides thereof, said recesses imparting to each said mercury cadmium telluride layer the serpentine configuration thereof.

18. A detector according to claim 14, including means operable at room temperature for detecting infrared radiation produced by flames, said means including said mercury cadmium telluride layer.

19. A detector according to claim 18, wherein said means includes a further mercury cadmium telluride layer having a serpentine configuration; and wherein each of said mercury cadmium telluride layers detects infrared radiation within a respective different waveband.

20. A detector according to claim 19, wherein said mercury cadmium telluride layers each having alternating recesses in opposite sides thereof, said recesses imparting to each mercury cadmium telluride layer the serpentine configuration thereof.

21. A method of fabricating a mercury cadmium telluride detector, comprising the steps of:

depositing a mercury cadmium telluride film on a deposition template so that the film has a compositional gradient in a direction normal to the template;

removing a portion of the film on a side thereof opposite from the template to define a first surface extending at an angle to the template;

removing the template and a further portion of the film on a side thereof opposite from the first surface to define a second surface extending approximately parallel to the first surface, thereby leaving a slice of the film which has the first and second surfaces on opposite side thereof, and which has a compositional gradient in a direction parallel to the first and second surfaces;

adhering the slice to a substrate; and etching the slice to leave spaced first and second portions thereof on the substrate, the first and second portions having different compositions of mercury cadmium telluride.

* * * * *

UNITED STATES PATENT AND TRADEMARK OFFICE
CERTIFICATE OF CORRECTION

PATENT NO. : 5,920,071
DATED : July 6, 1999
INVENTOR(S) : Donald F. Weirauch

It is certified that error appears in the above-identified patent and that said Letters Patent is hereby corrected as shown below:

Column 1, line 8, after "TO" delete "COMMONLY-OWNED, CO-FILED".
Column 3, line 48, after "compositions" delete "at room temperature".
Column 4, line 65, after "than" delete "10" and insert --20--.
Column 5, line 3, after "of" delete "$Hg_{0.82}Cd_{0.18}$" and insert --$Hg_{0.8}Cd_{0.2}$--.
Column 5, line 4, before "μm" delete "10" and insert --20--.

Signed and Sealed this

Twelfth Day of September, 2000

Attest:

Q. TODD DICKINSON

*Attesting Officer*    *Director of Patents and Trademarks*